United States Patent [19]

Schimmel et al.

[11] Patent Number: 4,780,294

[45] Date of Patent: Oct. 25, 1988

[54] PROCESS FOR MAKING CRUDE PHOSPHORIC ACID

[75] Inventors: Günther Schimmel, Erftstadt; Friedrich Kolkmann, Brühl; Reinhard Gradl; Herbert Ressel, both of Erftstadt, all of Fed. Rep. of Germany

[73] Assignee: Hoechst Aktiengesellschaft, Frankfurt am Main, Fed. Rep. of Germany

[21] Appl. No.: 10,333

[22] Filed: Feb. 3, 1987

[30] Foreign Application Priority Data

Feb. 17, 1986 [DE] Fed. Rep. of Germany ....... 3604920

[51] Int. Cl.$^4$ ...................... C01B 25/16; C01B 17/16
[52] U.S. Cl. ................................ 423/321 R; 423/220; 423/317; 423/320
[58] Field of Search ................... 423/317, 320, 321 R, 423/561 R, 230, 220

[56] References Cited

U.S. PATENT DOCUMENTS 2,003,051  5/1935  Knox .............................. 423/321 R
3,511,604  5/1970  Lloyd et al. ...................... 423/320

FOREIGN PATENT DOCUMENTS 59-184291 10/1984 Japan .................................. 423/225

Primary Examiner—Gregory A. Heller

[57] ABSTRACT

Crude phosphoric acid is made by subjecting crude phosphate ore containing sulfide to processing treatment with a mineral acid in a closed system comprised of a processing reactor, a filtering zone and an off-gas scrubbing zone. To this end, a soluble compound of a metal forming difficultly soluble sulfides in the respective acid medium is added either (A) during the processing operation the phosphate ore is subjected to or (B) during the scrubbing operation the off-gas is subjected to and the resulting sulfide precipitate is filtered off in case (A) together with further matter precipitated during the processing operation and, in case (B) separated from the scrubbing liquid.

3 Claims, No Drawings

PROCESS FOR MAKING CRUDE PHOSPHORIC ACID

The present invention relates to a process for making crude phosphoric acid by subjecting crude phosphate ore containing sulfide to processing treatment with a mineral acid in a closed system comprised of a processing reactor, filtering zone and off-gas scrubbing zone.

Speaking generally, phosphoric acid is produced today by processing crude phosphate with a mineral acid, such as sulfuric acid, hydrochloric acid or nitric acid. Processes of this kind are generally and widely known. The acid most widely used for processing is sulfuric acid.

Apart from the elements calcium and phosphorus, the calcium phosphate ores contain a wide variety of secondary constituents, namely, for example, a plurality of metals, carbonates, sulfates and especially fluoride originating from apatite ($Ca_5(PO_4)_3F$.

The sulfide content (up to 0.1%) is remarkably high especially in so-called calcined crude phosphates. Ores are however customarily calcined whenever it is desirable for their quality and $P_2O_5$-concentration to be increased by lowering their $CO_2$-content and content of organic contaminants. During the calcination, sulfur of higher valency contained in the ore is obviously reduced to sulfide sulfur.

It is, however, the calcination which is increasingly gaining interest as it permits ores of low $P_2O_5$-content which find more and more widespread uses to be qualitatively improved; secondly, the calcined ores permit the production of wet-process phosphoric acid which is relatively easy to convert to pure phosphoric acid or commercial phosphate grades.

The use of ores containing sulfide for phosphate processing is however a problem as the sulfide partially reacts in the acid medium to give hydrogen sulfide which escapes into the atmosphere, together with off-gas coming from the processing station. This latter normally has an acid scrubbing stage connected to it in which the off-gas can indeed be freed from HF and $SiF_4$ but substantially not from $H_2S$ as it fails to be retained therein.

To remedy this, it is possible for the off-gas to be additionally scrubbed with sodium hydroxide solution with the resulting formation of a sodium sulfide solution, or for it to be treated with an oxidant, such as $H_2O_2$, with the resulting formation of sulfate. In these two cases, it is invariably necessary for the chemicals to be used in a large excess with formation of undesirable waste water containing sulfide or sulfate. In addition, large quantities of $CO_2$ originating from the processed gas and cooling air are co-absorbed whenever the off-gas is scrubbed with an alkaline medium; this means undesirable consumption of alkaline medium and also the appearance of encrustation phenomena due to the formation of alkali metal carbonate.

To avoid the disadvantages associated with the above prior methods, the present invention now unexpectedly provides a process for making crude phosphoric acid by subjecting crude phosphate ore containing sulfide to processing treatment with a mineral acid in a closed system comprised of a processing reactor, a filtering zone and an off-gas scrubbing zone, which comprises: adding either (A) during the processing operation the phosphate ore is subjected to or (B) during the scrubbing operation the off-gas is subjected to
a soluble compound of a metal forming a difficulty soluble sulfide in the respective acid medium, and filtering off the resulting sulfide precipitate in case (A) together with further matter precipitated during the processing operation and, in case (B) separating it from the scrubbing liquid.

Useful in the process of this invention are especially compounds of the subgroup metals belonging to the 4$^{th}$ period of the Periodic System of the elements, and also compounds of silver, cadmium, mercury, lead, arsenic, antimony, bismuth and, preferably copper.

The metal compounds should conveniently be used in at most stoichiometric proportions, based on the quantity of sulfide present.

To this end, the invention provides for the phosphate ore to be admixed with a copper compound completely soluble under the processing conditions selected, the copper compound being used in a proportion which approximately corresponds stoichiometrically to the quantity of $H_2S$ normally set free. It is also possible however for the copper to be introduced into the reactor e.g. in dissolved form together with recycled scrubbed phosphoric acid.

Useful agents are especially those in which the copper already exists in an oxidized bivalent state, as e.g. in a readily soluble copper salt, such as $CuSO_4$, or in acid-soluble copper ore free from sulfide. A further advantageous feature of the process of this invention provides for the copper to be used in the form of a second sulfide-free phosphate ore containing more copper. In this way, it is possible by the use of a suitable blend of two phosphate ores of which one contains sulfide and the other is substantially free from sulfide, to suppress the emission of $H_2S$.

The phosphoric acid of this invention can ultimately be worked into material for industrial use or can be used as a raw material for making fertilizers. In this latter case, the contamination of the acid originating from the metered addition of copper in slightly overstoichiometric proportions may turn out undesirable. This can be remedied however by admixing the water used for scrubbing the off-gas with a readily soluble metal compound, e.g. copper sulfate. In contact with $H_2S$, easy-to-filter copper sulfide commences precipitating which can be separated as solid matter in the recycling step by means of an appropriate separator, e.g. a filter or centrifuge. Needless to say it is necessary for scrubbing water to be admixed at regular intervals with metal replacing the metal consumed. It is basically also possible for the sulfide separated to be reworked into a soluble salt, such as sulfate, which can be recycled.

If, e.g. upon the use of $CuSO_4$, the content of free sulfuric acid in the scrubbing water becomes unduly high with the passage of time, it is necessary for such acid water to be partially separated and used e.g. as scrubbing water in the calcium sulfate filter or for it to be recycled directly into the processing reactor.

The following Examples illustrate the invention which is naturally not limited thereto, the percentages being by weight unless otherwise stated.

EXAMPLE 1

(Comparative Example)

2480 g commercial phosphoric acid (17% $P_2O_5$) and 978 g crude phosphate (Khouribga calcined, 33.2%

$P_2O_5$, 0.035% $S^{2-}$) were placed at 70° C. in a gastight processing reactor provided with a gas inlet, stirrer, dropping funnel and reflux condenser with gas outlet.

Next, altogether 878 g commercial sulfuric acid (96% $H_2SO_4$) was metered into the suspension so as to establish a constant temperature of 70° C.±2° C.

By means of a carrier gas (60 1/h air) which was continuously admitted to the reaction chamber through the gas inlet, the off-gas evolved during phosphate processing was introduced through the reflux condenser, initially into an empty gas scrubbing bottle and then into a system of scrubbing bottles for absorptive determination of its $H_2S$-content in accordance with VDI guide lines 3486, page 1.

The carrier gas stream was generated using a membrane pump the intake side of which was directly downstream of the gas scrubbing bottles.

The off-gas was found to contain 93.4 mg sulfide (column 5 in Table 1); this corresponded to 27.3% of the sulfide sulfur contained in the crude phosphate (column 7).

EXAMPLE 2

Khouribga phosphate was processed as described in Example 1, but prior to commencing adding the sulfuric acid, the suspension was additionally admixed with 0.88 g $CuSO_4$. 5 $H_2O$ (3.5 millimol, corresponding to 33% of the stoichiometric quantity of Cu needed for binding the overall quantity of sulfide sulfur contained in the phosphate). The off-gas was found to contain 0.1 mg sulfide. In other words, practically all of the sulfide sulfur was retained in the calcium sulfate suspension.

EXAMPLE 2

(Comparative Example)

978 g Youssoufia crude phosphate (33.5% $P_2O_5$; 0.059% $S^{2-}$) was processed with sulfuric acid as described in Example 1.

The off-gas was found to contain 210 mg sulfide (column 5); this corresponded to 36.4% of the sulfide sulfur contained in the crude phosphate.

EXAMPLE 4

Youssoufia phosphate was processed as described in Example 3, but prior to commencing adding the sulfuric acid, the suspension was additionally admixed with 2.25 g $CuSO_4$. 5 $H_2O$ (9.0 millimol; corresponding to 50% of the stoichiometric quantity of Cu).

The off-gas was found to contain 8.4 mg sulfide (column 5). As can be seen, the $H_2S$-emission was significantly reduced.

EXAMPLE 5

Youssoufia phosphate was processed as described in Example 4 with addition of $CuSO_4$.5 $H_2O$ save that the $CuSO_4$.5 $H_2O$ quantity was doubled.

The off-gas was found to contain 0.2 mg sulfide (column 5). As can be seen, the $H_2S$-emission was almost completely suppressed.

EXAMPLE 6

(Comparative Example)

The apparatus was the same as that described in Example 1. It was charged initially with 2482 g phosphoric acid (42.2% $P_2O_5$) and 489 g Youssoufia phosphate at 95° C. and the suspension was admixed then with altogether 439 g sulfuric acid which was added in metered quantities so as to establish a constant temperature of 95°–98° C. in the suspension. The off-gas was found to contain 157.6 mg sulfide (column 5); this corresponded to 54.6% of the sulfide sulfur contained in the crude phosphate (column 7).

EXAMPLE 7

Yousouffia phosphate was processed as described in Example 6, but prior to commencing adding the sulfuric acid, the suspension was additionally admixed with 1.58 g $CuSO_4.5H_2O$ (6.3 millimonl; this corresponded to 70% of t stoichiometric quantity of Cu).

The off-gas was found to contain 32.4 mg sulfide (column 5). As compared with Example 6, the $H_2S$-emission was distinctly reduced.

EXAMPLE 8

Youssoufia phosphate was processed as described in Example 7 with addition of $CuSO_4$. 5 $H_2O$ save that the quantity of $CuSO_4$.5 $H_2O$ added was increased to 2.25 g (9 millimol; this corresponded to 100% of the necessary stoichiometric quantity of Cu).

The off-gas was found to contain 5 mg sulfide. As can be seen, the $H_2S$-emission was almost completely suppressed.

EXAMPLE 9

Youssoufia phosphate was processed as described in Example 3 save that the first empty gas scrubbing bottle was replaced by one which contained 258 g of a solution of $CuSO_4$.5 $H_2O$ in strongly dilute sulfuric acid (pH-value=2; 12.5 g Cu per g solution).

The off-gas so treated was found to contain just traces of $H_2S$.

CuS which precipitated in the gas scrubbing bottle was easy to remove with the aid of a pressure filter. The residue dried at 110° C. weighed 0.50 g.

TABLE

| | | | Column | | | | |
|---|---|---|---|---|---|---|---|
| | | | 3 | 4 | 5 | 6 | 7 |
| | | | Cu—addition | | $H_2S$—emission | | |
| | 1 | 2 | wgt % based | mol % based | | | Sulfide in off-gas, |
| | Crude | Processing | on crude | on sulfide content | | mg $H_2S$/kg | based on content in |
| Ex. | phosphate | temp. °C. | phosphate | in crude phosphate | [mg $S^{2-}$] | phosphate | crude phosphate |
| 1 | Khouribga | 70 | — | — | 93.4 | 101.5 | 27.3 |
| 2 | | 70 | 0.022 | 33.0 | <0.1 | <0.1 | <0.01 |
| 3 | Youssoufia | 70 | — | — | 210.0 | 228.1 | 36.4 |
| 4 | | 70 | 0.059 | 50.0 | 49.6 | 53.9 | 8.6 |
| 5 | | 70 | 0.117 | 100.0 | 0.2 | 0.22 | 0.04 |
| 6 | Youssoufia | 95–98 | — | — | 157.6 | 342.5 | 54.6 |
| 7 | | 95–98 | 0.081 | 70.0 | 32.4 | 70.4 | 11.2 |

TABLE-continued

| | | Column | | | | |
|---|---|---|---|---|---|---|
| | | 3 | 4 | 5 | 6 | 7 |
| | | Cu—addition | | | H$_2$S—emission | |
| Ex. | 1<br>Crude<br>phosphate | 2<br>Processing<br>temp. °C. | wgt % based<br>on crude<br>phosphate | mol % based<br>on sulfide content<br>in crude phosphate | [mg S$^{2-}$] | mg H$_2$S/kg<br>phosphate | Sulfide in off-gas,<br>based on content in<br>crude phosphate |
| 8 | | 95–98 | 0.117 | 100.0 | <5 | <10 | <1.7 |

We claim:

1. In the process for making crude phosphoric acid by subjecting crude phosphate ore containing sulfide to processing treatment with a mineral acid in a closed system comprised of a processing reactor, a filtering zone and an off-gas scrubbing zone, the improvement which comprises: adding during the scrubbing operation, which the off-gas is subjected to, a readily soluble copper salt to the scrubbing liquid and filtering off the resulting sulfide precipitate from the scrubbing liquid.

2. The process as claimed in claim 1, wherein the copper salt is used in at most stoichiometric proportions, based on the quantity of sulfide present.

3. The process as claimed in claim 1, wherein the readily soluble copper salt is copper sulfate.

* * * * *